US006354457B1

(12) United States Patent
Aaron

(10) Patent No.: US 6,354,457 B1
(45) Date of Patent: Mar. 12, 2002

(54) PRESSURE VESSEL

(76) Inventor: Audley L. Aaron, 4419 Shawna Dr., Houston, TX (US) 77084

( * ) Notice: Subject to any disclaimer, the term of this patent is extended or adjusted under 35 U.S.C. 154(b) by 0 days.

(21) Appl. No.: 09/542,726

(22) Filed: Apr. 4, 2000

(51) Int. Cl.[7] .......................... F16J 13/00

(52) U.S. Cl. .......................... 220/582; 220/581; 220/592; 220/646; 220/692

(58) Field of Search .......................... 220/682, 677, 220/688, 692, 1.5, 565, 567, 567.1, 567.2, 567.3, 646, 4.12, 592, 581

(56) References Cited

U.S. PATENT DOCUMENTS

| | | | | | |
|---|---|---|---|---|---|
| 709,303 | A | * | 9/1902 | Chester | 220/565 |
| 814,160 | A | * | 3/1906 | Paige | 220/646 |
| 1,127,226 | A | * | 2/1915 | Gamble | 220/4.12 |
| 1,894,649 | A | * | 1/1933 | Walp | 220/1.5 |
| 1,983,355 | A | * | 12/1934 | Escher | 220/565 |
| 2,952,922 | A | * | 9/1960 | Wenzl | 220/4.12 |
| 3,365,091 | A | * | 1/1968 | Sciaky | 220/646 |
| 3,451,452 | A | * | 6/1969 | Marshall et al. | 220/646 |
| 3,477,605 | A | * | 11/1969 | Garland | 220/646 |
| 4,227,524 | A | | 10/1980 | Galerne | |
| 4,484,689 | A | * | 11/1984 | Fuch, Jr. | 220/646 |
| 4,562,979 | A | | 1/1986 | Taylor | |
| 4,606,195 | A | | 8/1986 | Winkler | |
| 4,633,859 | A | | 1/1987 | Reneau | |
| 4,872,625 | A | | 10/1989 | Filley | |
| 5,402,775 | A | | 4/1995 | Reneau | |
| 5,421,340 | A | | 6/1995 | Stanga et al. | |
| 5,454,368 | A | | 10/1995 | Tarulli | |
| 5,618,126 | A | | 4/1997 | Watt | |
| 5,685,293 | A | | 11/1997 | Watt | |
| 5,803,402 | A | | 9/1998 | Krumweide et al. | |
| 5,806,799 | A | | 9/1998 | Lounge | |
| 5,899,846 | A | | 5/1999 | Sternberg et al. | |

* cited by examiner

*Primary Examiner*—Allan N. Shoap
*Assistant Examiner*—Joseph C. Merek
(74) *Attorney, Agent, or Firm*—Browning Bushman P.C.

(57) ABSTRACT

A pressure vessel having a housing forming a chamber of a polygonal cross-section, the sides of the housing being formed by at least one panel, the panel forming one side being connected to the panels forming an adjacent side by a connector assembly that permits the connected panels at the juncture of the connector assembly to pivot or move relative to one another in the substantial absence of any bending stress at such juncture, and a seal being used to form fluid-tight seals between adjacent sides.

17 Claims, 7 Drawing Sheets

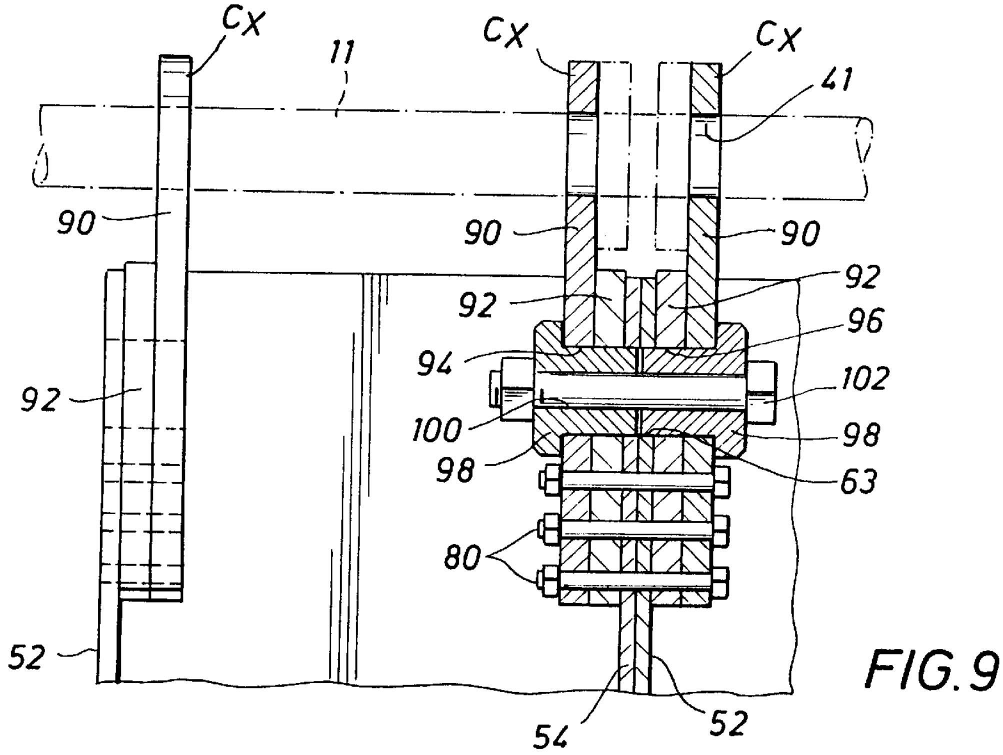
FIG. 9
FIG. 10
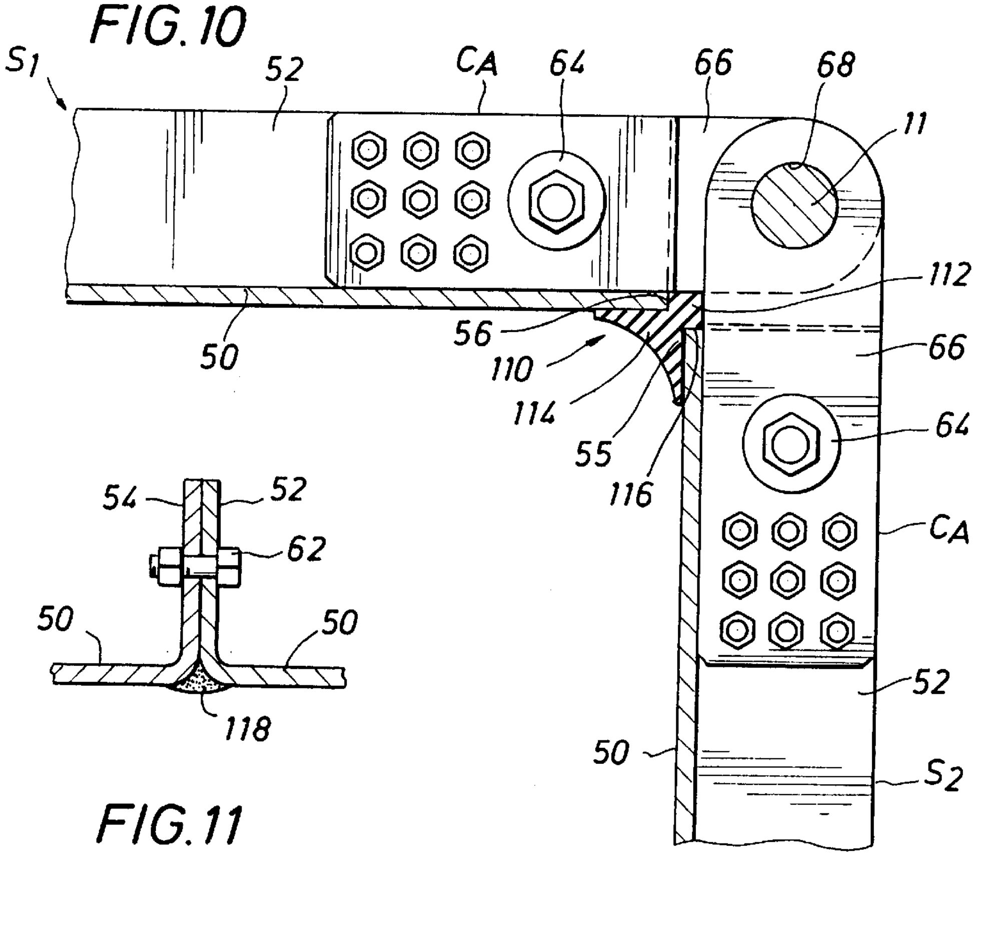
FIG. 11

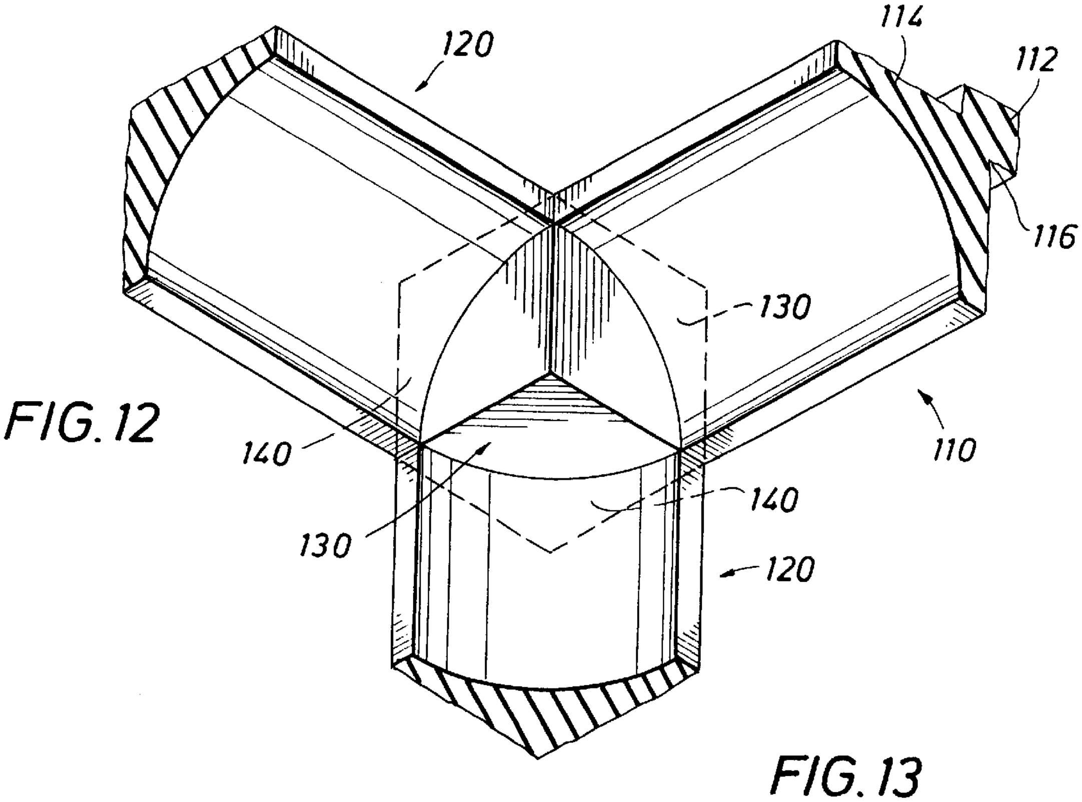
FIG. 12
FIG. 13
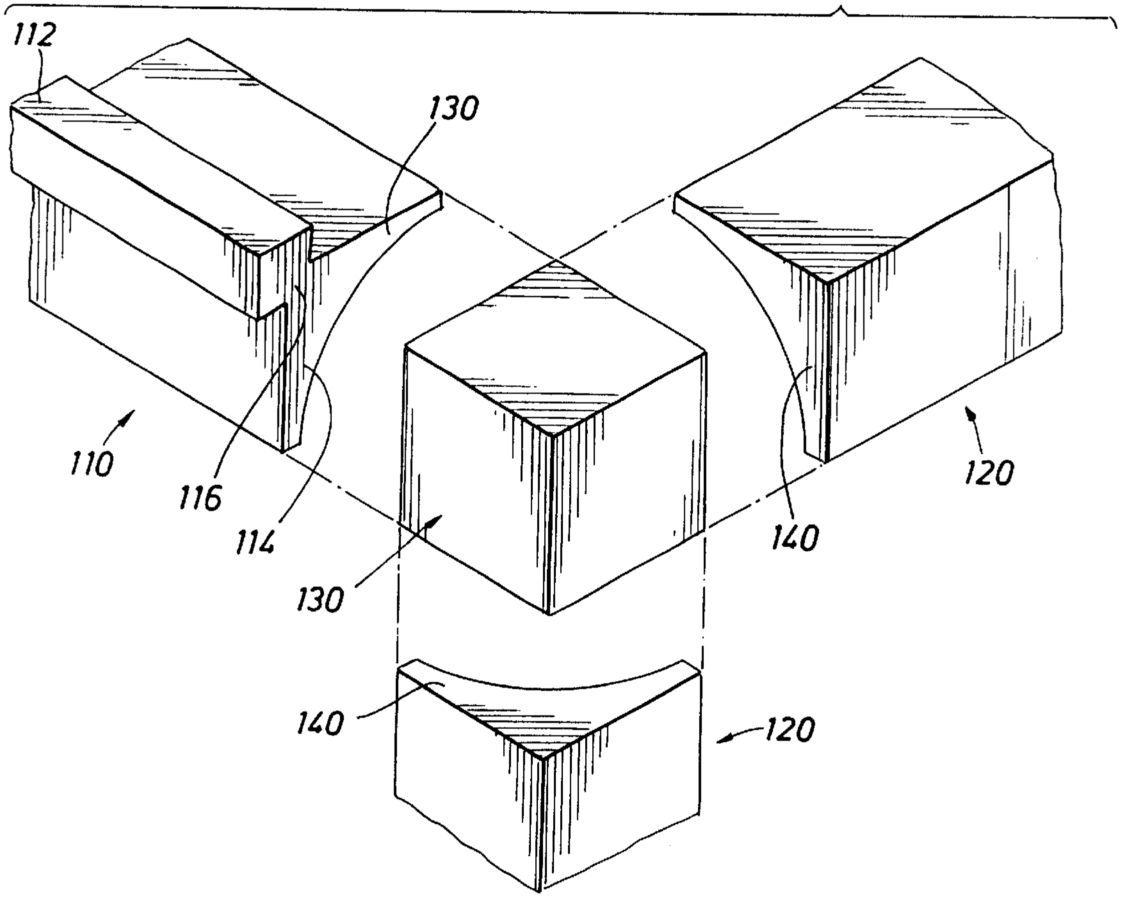

PRESSURE VESSEL

BACKGROUND OF THE INVENTION

1. Field of the Invention

The present invention relates to pressure vessels and, more particularly, to such vessels that are modular and can be easily fabricated into a variety of shapes and sizes.

2. Description of the Prior Art

Pressure vessels for resisting internal or external pressures are well-known and used in a variety of applications. In particular, so-called hyperbaric chambers arc widely used in the medical field, as well as in the aerospace industry as altitude chambers and space habitats. As is well-known, typically pressure vessels, including vessels forming hyperbaric chambers, are fabricated so as to have predominantly cylindrical or spherical walls so as to minimize any localized pressure-induced stresses. The problem with such shaped pressure vessels, particularly those used as pressure vessels for human occupancy (PVHO), such as hyperbaric chambers in medical applications, is that in order to make the hyperbaric chambers comfortable to patients, the structures forming the hyperbaric chambers have to be relatively large. Inherently, such vessels are heavy and difficult to transport and install. Furthermore, once installed, these prior art vessels cannot be easily modified, e.g., to change size. Clearly, a hyperbaric chamber that is rectangular in configuration is more desirable from the point of view of patient comfort and accessibility. The problem with any polygonally shaped chamber is that the individual walls of the chamber forming the polygonal shape are usually welded, or in some other manner rigidly connected, together. This invariably means that the chamber must be of a fixed size. Furthermore, as is well known to those skilled in the art, in these rigidly connected, polygonally shaped pressure vessels, the walls are subjected to bending moments that induce high bending stresses at the rigid connections—i.e., the corners where the walls interface and are connected.

SUMMARY OF THE INVENTION

It is therefore an object of the present invention to provide a pressure vessel having a cross-sectional configuration that is polygonal—i.e., has multiple sides.

Another object of the present invention is to provide a pressure vessel of polygonal cross-sectional configuration that can be fabricated without welding, or otherwise rigidly connecting, together the sides of the vessel forming the polygonal shape.

Still a further object of the present invention is to provide a pressure vessel that is modular in construction.

Yet a further object of the present invention is to provide a pressure vessel that can be easily transported and readily assembled at various sites.

Another object of the present invention is to provide a pressure vessel that can be readily altered as to size and shape.

The above and other objects of the present invention will become apparent from the drawings, the description given herein, and the appended claims.

In its broadest sense, the present invention provides a pressure vessel having a housing formed by at least three connected sides forming a chamber. The chamber preferably has at least one chamber opening. Each of the sides has at least two connection edges. A connector assembly flexibly, e.g., hingedly, connects a connection edge in one side to a connection edge in an adjacent side. A seal effects fluid-tight sealing between the connected sides. A closure, e.g., a bulkhead, is sealingly secured over the chamber opening when present.

In a preferred form, the present invention provides a pressure vessel having a housing formed by at least three connected sides forming a chamber, which in the case with three sides would be triangular in cross-section. The chamber has a first chamber opening and, in a preferred case, a second chamber opening. Each of the sides comprises at least one side panel. Each side panel has a web section with a first edge and a second edge, a first flange portion extending from the first edge of the web section, a second portion extending from the second edge of the web section. The first and second flange portions are substantially parallel. Each of the panels has a first end and a second end. There is a connector on each of the flange portions adjacent each of the ends of the panel, each of the connectors having a leaf projecting outwardly of the end of the panel. Each of the leaves has a first face and a second face and a bore extending through and transverse to the first and second faces, the bores in the leaves on a given end of a panel being in register. The leaves on connected ends of adjacent panels are spaced relative one another so as to interlaminate when an end of one panel is connected to the end of an adjacent panel, the bores of the interlaminated leaves being in register. A tie rod extends through the registered bores of the interlaminated leaves to hold the connected ends of the adjacent panels together. A fluid-tight seal effects sealing between adjacent sides. There is a first closure member or bulkhead sealingly secured over the first chamber opening and, in the preferred case, a second closure member or bulkhead sealingly secured over the second chamber opening. In a preferred embodiment, an access door can be provided through one of the bulkheads or through one or both of the side panels, as desired.

BRIEF DESCRIPTION OF THE DRAWINGS

FIG. 9 is an enlarged, detailed view showing an alternate construction of the panels and corner connectors used in the pressure vessel of the present invention;

FIG. 10 is an enlarged elevational view, partly in section, showing the corner connection and sealing of the side panels;

FIG. 11 is an enlarged fragmentary view, partially in section, showing grouting between adjacent flanges of two panels;

FIG. 12 is an isometric view from the inside of the pressure vessel showing the seal assembly used between the adjacent ends of connected panels and between an end panel and a bulkhead; and FIG. 13 is an exploded view of the seal assembly shown in FIG. 12 but showing the seal assembly from the outside of the pressure vessel.

DETAILED DESCRIPTION OF THE PREFERRED EMBODIMENT

Figure 1:
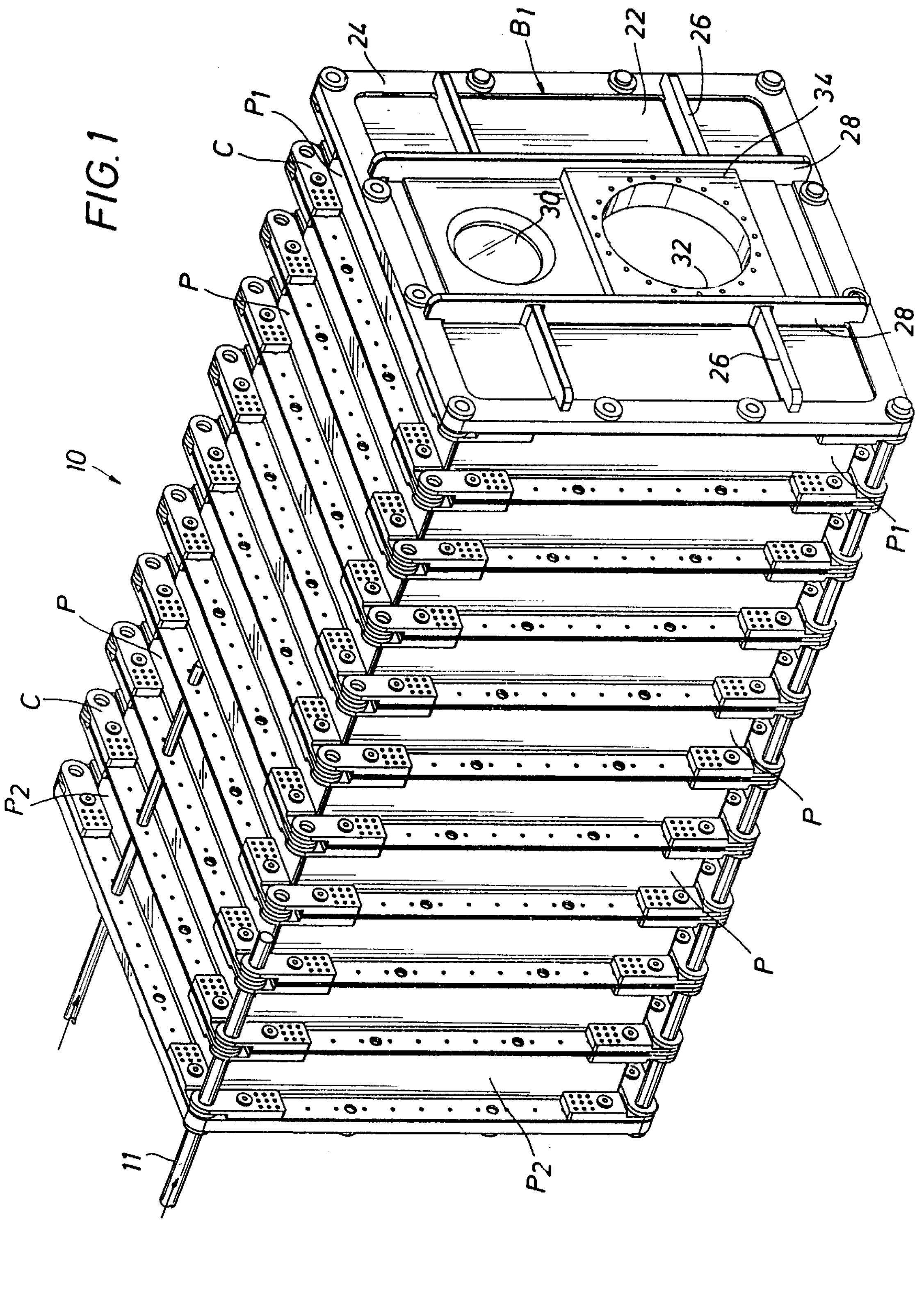
FIG. 1 is a perspective view of the pressure vessel of the present invention.
Figure 2:
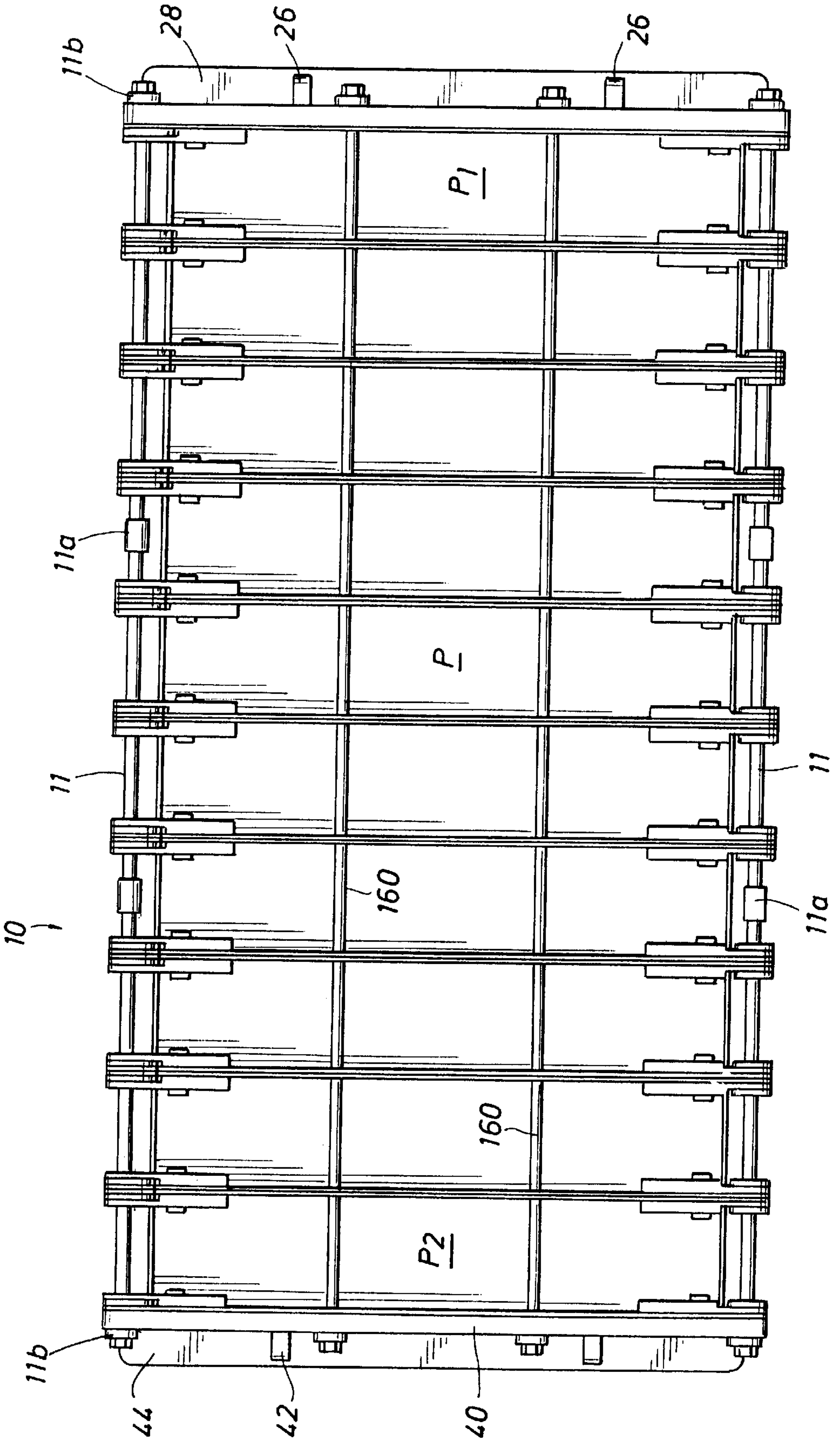
FIG. 2 is a side, elevational view of the pressure vessel of the present invention.
Figure 3:
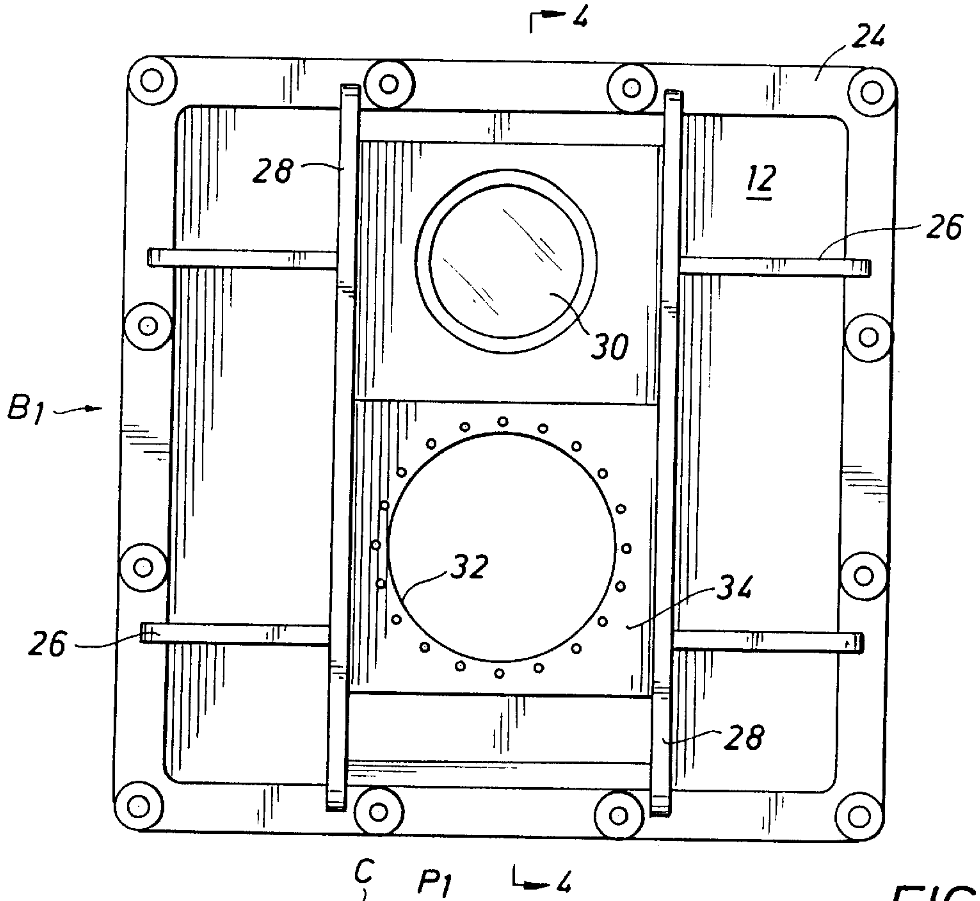
FIG. 3 is an end, elevational view of the pressure vessel of the present invention.

With reference first to FIGS. 1 and 2, the pressure vessel, shown generally as 10, is a generally rectangular housing formed by a series of interconnected panels P, the connection between the panels being described in greater detail hereinafter. While the pressure vessel 10 will be described with reference to a generally rectangular housing forming a generally rectangular interior chamber, the pressure vessel 10 can be constructed of virtually any number of sides (at least 3) to form a chamber 13 having a polygonal cross-sectional shape determined by the number of sides.

The panels forming the sides of the pressure vessels 10 are interconnected by means of connectors C and tie rods 11, described more fully hereinafter. The chamber 13 formed by the sides of the housing has a first chamber opening 15 (see FIG. 4) and a second chamber opening 17 (see FIG. 6). Secured over chamber opening 15 is a bulkhead $B_1$, while a second bulkhead $B_2$ (see FIG. 5) is secured over chamber opening 17. As described more fully hereinafter, bulkheads $B_1$ and $B_2$ are sealingly secured to panels forming the endmost section of the housing. Thus, bulkhead $B_1$ is sealingly secured to panels $P_1$, forming one end section of pressure vessel 10, while bulkhead $B_2$ is sealingly secured to panels $P_2$, forming an opposite end section of housing 10. Thus, in the embodiment being described, there is a set of four panels $P_1$ forming an end section adjacent bulkhead $B_1$ and a set of four end panels $P_2$ forming an end section adjacent bulkhead $B_2$.

Figure 4:
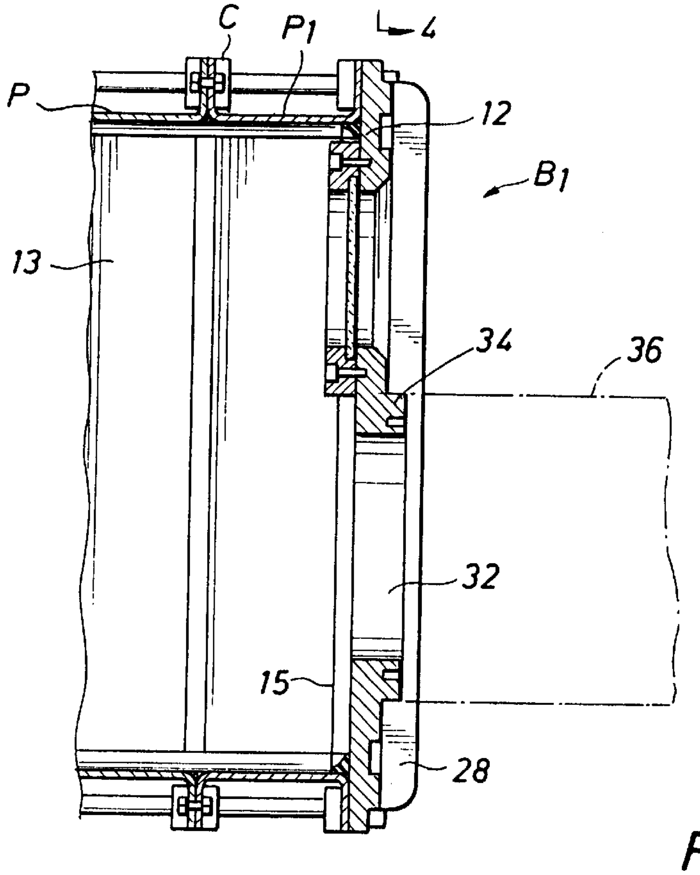
FIG. 4 is a view taken along the lines 4—4 of FIG. 3.

Bulkhead $B_1$ is a cast body and comprises a bulkhead plate 22 reinforced by a framework comprised of a perimeter frame 24, ribs 26, and beams 28. Bulkhead $B_1$ is further provided with a viewing window 30 for observing the interior of pressure vessel 10 and a hatch opening 32 formed in a hatch plate 34. As shown in FIG. 4, a tube 36 or the like can be removably attached to hatch plate 34 to access chamber 13.

Figure 5:
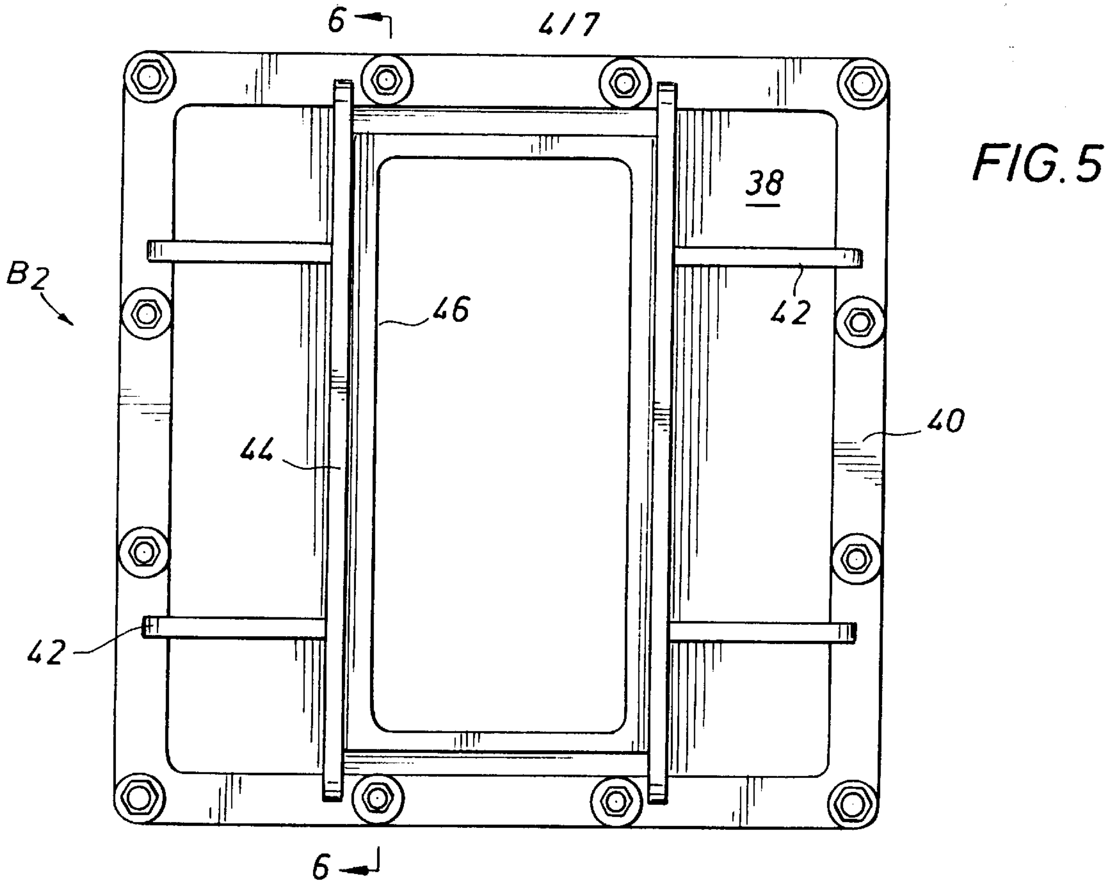
FIG. 5 is an opposite, end elevational view of the pressure vessel of the present invention.
Figure 6:
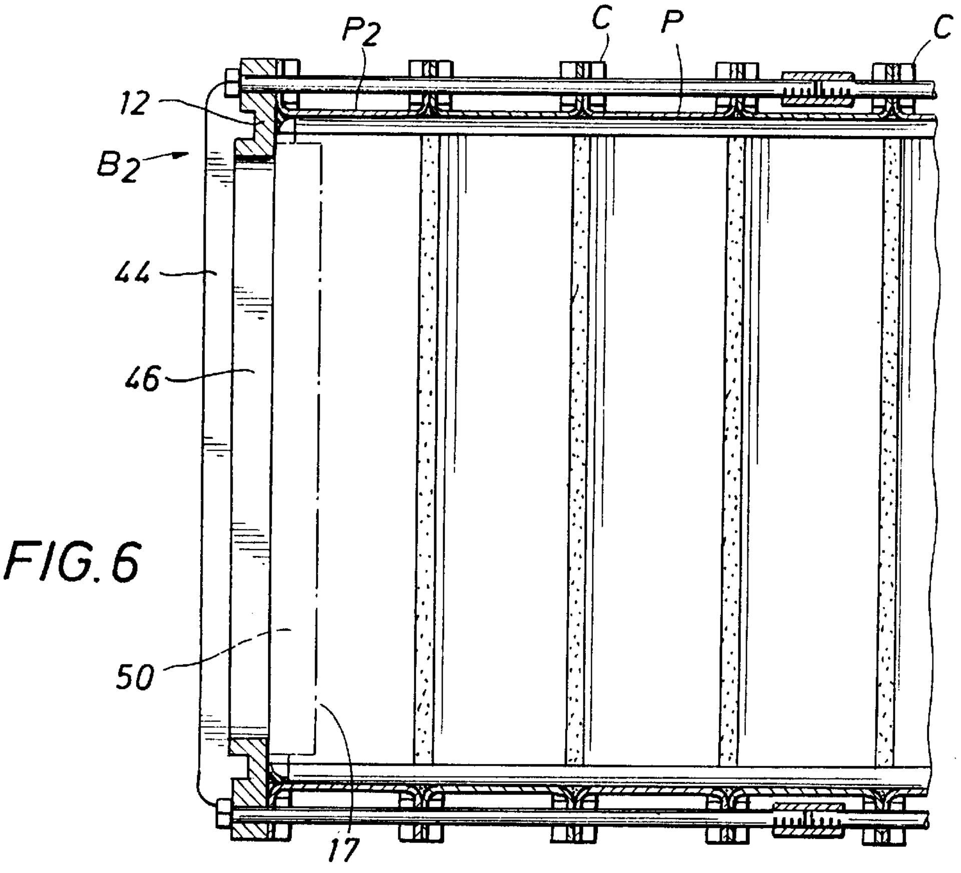
FIG. 6 is a cross-sectional view taken along the lines 6—6 of FIG. 5.

With reference now to FIGS. 5 and 6, the second bulkhead, shown generally as $B_2$, is, as bulkhead $B_1$, a cast body and comprises a bulkhead plate 38 and a reinforcing framework comprised of a perimeter frame 40, ribs 42, and beams 44. Bulkhead $B_2$ is also provided with an access opening 46 to permit ingress and egress into and out of pressure vessel 10. As shown in FIG. 6, opening 46 can be provided with a door, shown in phantom as 50. While bulkheads $B_1$ and $B_2$ are described as castings, it will be understood that they could be fabricated as well.

Figure 7:
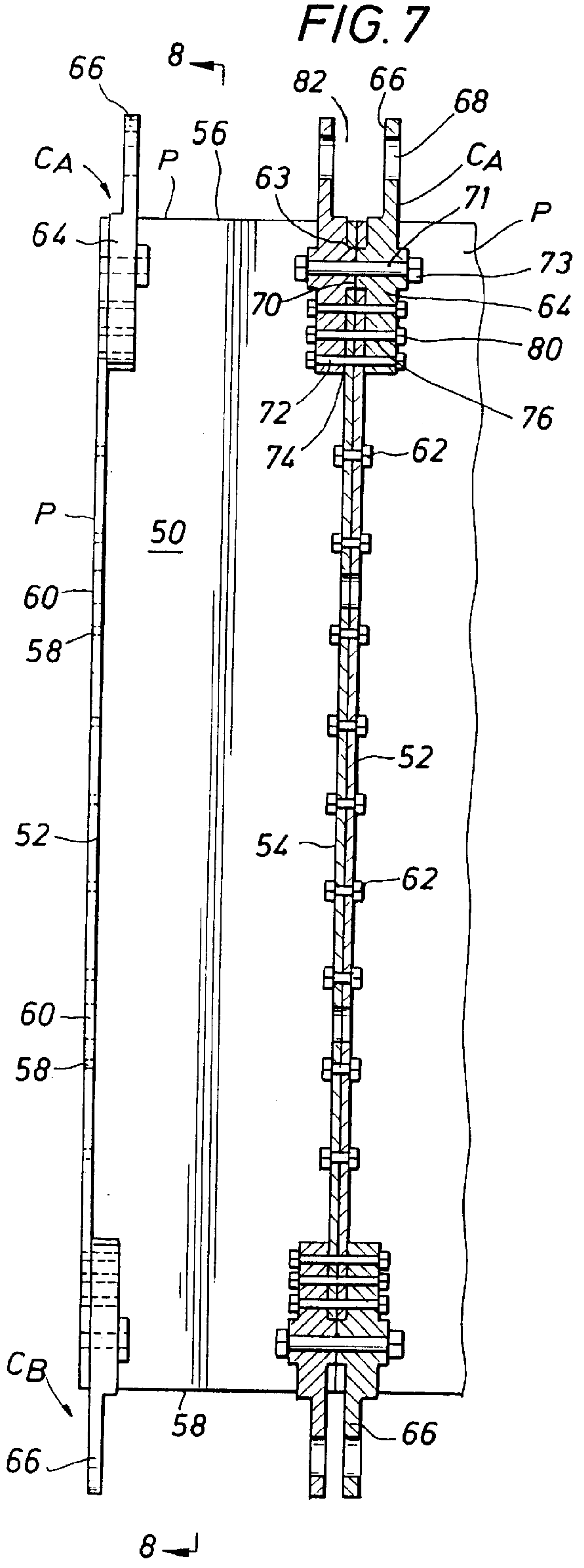
FIG. 7 is a fragmentary view, partially in section, showing the side panel construction and corner connectors used in the pressure vessel of the present invention.
Figure 8:
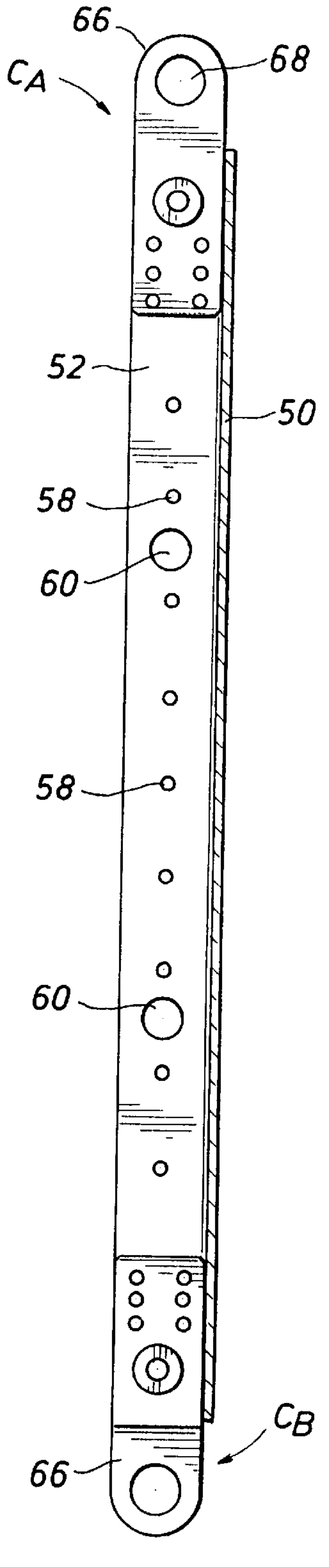
FIG. 8 is view taken along the lines 8—8 of FIG. 7.

With reference now to FIGS. 7, 8, and 9, the panel and connector constructions used to fabricate pressure vessel 10 is shown. Panel P is generally channel-shaped, having a web section 50, each of the panels P having a first end 56 and a second end 58. Depending from a first edge of web section 50 is a flange portion 52, while a flange portion 54 depends from a second edge of web section 50, flange portions 52 and 54 being generally parallel to one another. Panels P can be constructed of metal, plastic, composites, fiberglass, concretes, or virtually any material that possesses sufficient tensile strength so as to resist rupturing from either internal or external pressure acting on pressure vessel 10. As noted and with reference to FIG. 1, pressure vessel 10 is generally constructed such that each side is comprised of a series of panels P disposed in side-by-side relationship, each side having the same number of panels P. It is a feature of the present invention that the pressure vessel 10 of the present invention is modular in the sense that its size can be varied within wide limits simply by adjusting the number of panels per side.

While the panels P have been described generally with reference to a channel-shaped member, it is understood that the panels can be of virtually any construction. Accordingly, the term "panel" as used herein means any structural member or assemblage thereof that has at least a first connector end or edge and a second connector end or edge and that can be used to at least partially form a side of a pressure vessel of the type described herein. For example, rather than a channel-shaped member, the panels could be formed of a box tube. It is also to be understood that the panels used in the pressure vessels of the present invention need not be constructed such that they have a planar surface. Thus, for example, the panels P described above could be shaped such that the web section 50 is curvilinear rather than being planar. Further, the panels need not have flanges for assembly in side-by-side relationship. Additionally, the panels need not be rectangular but could be triangular or hexagonal, or for that matter, could have any polygonal shape, and likewise in these various polygonal shapes, could be planar or curvilinear. It will be appreciated that the pressure vessels that can be made in accordance with the present invention can be virtually any shape, depending upon the shape of the panels. For example, a structure akin to a geodesic dome could be constructed wherein all the facets or panels forming the dome are flexibly interconnected to one another such that the bending stresses at the junctures or corners of the interconnecting panels would be virtually eliminated. It should also be understood that a "side" can be made of a single panel or, as described above, multiple panels.

As shown in FIG. 8, flange portion 52 is provided with a series of holes 58 that are spaced along the length of flange portion 52. Additionally, flange portion 52 is provided with tie rod holes 60 and aligning apertures 62 (see FIG. 7). As can be seen from FIG. 7, flange portion 54 is essentially a mirror image of flange portion 52. When the panels P are arranged in side-by-side relationship, as seen in FIG. 7, the holes 58 accommodate a nut and bolt assembly 62 that secures flange portion 54 of one panel to flange portion 52 of another panel, tie rod holes 60 then being in register.

In the embodiment shown in FIG. 7, each connector $C_A$ attached to panel P adjacent end 56 is comprised of a body portion 64 from which extends a leaf 66, leaf 66 being provided with a bore 68. Body 64 of connector $C_A$ has a generally cylindrical aligning boss 70 with a series of fastener holes 72 and a bore 71 extending through boss 70. To assemble panels of a given side together, the panels P are aligned such that the holes 58 are in register whereby nut and bolt assemblies 62 can be used to secure flanges 52 and 54 together. A first connector $C_A$ is then positioned on flange 54 such that aligning boss 70 is received in aligning aperture 63, bores 71 in the aligning bosses 70 being in register with one another, fastener bores 72 in the body portion being in register with fastener holes 74 and 76 formed in flange portions 54 and 52, respectively. Nut and bolt assemblies 80, or some other suitable fasteners, received in bores 72, 74, and 76 serve to further secure a connector $C_A$ to each flange 52, 54, thus forming a receiving socket 82 between spaced apart leaves 66. Additionally, a nut and bolt assembly is received in the registered bores 71 of aligning bosses 70.

It can be seen from FIG. 7 that the connectors $C_A$ attached to the end 58 of panel P are identical to the connectors $C_A$ attached to the end 56 of panel P, but that in the case of the connectors $C_A$ attached to the end 56, a first side of the connectors $C_A$ is attached to the flanges 52, 54, while in the case of the connectors $C_A$ attached to the end 58 of panel P, the opposite side of connectors $C_A$ are attached to flange portions 52, 54. What this effectively means, and as can be seen from FIG. 7, is that the leaves 66 have a different spacing—i.e., the leaves 66 on end 56 are closer to one another than are the leaves 66 on end 58. It will thus be seen that when panels P, forming one side, are connected in end-to-end relationship with panels P, forming an adjacent side—i.e., when the ends 56 of panels forming a given side of the pressure vessel are connected to the ends 58 of panels P, forming an adjacent side of the pressure vessel—the adjacent leaves 66 on flange portions 52, 54 adjacent end 58 will be received in the socket 82 formed by leaves 66 on end 56. In other words, spacing of the leaves is such that when an end of one panel P is connected to the end of an adjacent panel P, the leaves interlaminate. It will be apparent that a variety of configurations vis-a-vis the spacing of the leaves 66 can be employed.

With reference now to FIG. 9, there is shown a variation of the connector designated as $C_X$. Connectors $C_X$ differ from connectors $C_A$ in that whereas the latter connectors are monolithic bodies, connectors $C_X$ are formed by a series of plates. Thus, connectors $C_X$ comprises a leafplate 90 and a spacer plate 92, both of which are provided with aligning bores 94 and 96, respectively. Connectors $C_X$ further include an aligning bushing 98 having a bore 100 therethrough. When a series of panels P are arranged in side-by-side relationship to form a side of pressure vessel 10, aligning apertures 63 on flanges 52 and 54 will be in register. To secure connectors $C_x$ to the panels P, leaf plates 90 of spacer plates 92 are positioned such that apertures 63 and bores 94 and 96 arc in register, whereupon bushings 98 can be inserted in the passage formed by bores 94, 96 and apertures 63. A nut and bolt assembly 102 can then be used to effectively secure the connectors $C_X$ to the panels and to one another. Additionally, and as is the case with the connectors described with reference to FIGS. 7 and 8, nut and bolt assemblies 80 are further used to connect the connectors $C_X$ to the panels. As in the case with the connectors described in FIG. 7, connectors $C_X$ are arranged on the panel such that when the panels of one side are to be connected to the panels of an adjacent side, the leaves will interlaminate.

With reference to FIG. 10, there is shown a typical corner connection between adjoining sides of the pressure vessel 10. The connectors shown in FIG. 10 are the connectors of the embodiment of FIG. 7—i.e., the connectors $C_A$ are monolithic bodies as opposed to being formed from multiple plates, such as connectors $C_X$ shown in FIG. 9. With reference then to FIG. 10, it can be seen that with the leaves 66 of the connectors $C_A$ in interlaminated juxtaposition, and with tie rod 11 being received through registering bores 68 in the interlaminated leaves, adjoining sides of the pressure vessel 10 are essentially hinged to one another. Thus, assuming FIG. 10 shows a fragmentary portion of a side $S_1$ and an adjoining side $S_2$, it can be seen that sides $S_1$ and $S_2$ are free, at their adjoining ends, to rotate around an axis determined by tie rod 11. Accordingly, unlike a pressure vessel fabricated wherein the sides $S_1$ and $S_2$ would be welded together at their adjoining ends, sides $S_1$ and $S_2$ are free to move independently of one another around the axis determined by tie rod 11 because sides $S_1$ and $S_2$ are not rigidly connected to one another, and indeed, as can be seen, the ends 56 and 58 of the panels forming sides $S_1$ and $S_2$ do not touch. Because the sides $S_1$ and $S_2$ are not connected together at their corners by welding or by some other rigid attachment method, bending stresses at the corners formed by the intersections of sides $S_1$ and $S_2$ are virtually eliminated. As previously noted, in a welded pressure vessel of polygonal cross-sectional shape, there would be significant bending stresses at the corners formed by the intersecting sides making up the polygonal shape.

In order to effect sealing between sides $S_1$ and $S_2$, a novel seal design is employed. With reference again to FIG. 10, the seal shown generally as 110 is comprised of an outer body section 112 and an inner body section 114, body sections 112 and 114 being connected by a web section 116. Because seal 110 is resilient or flexible in nature, any pressure acting from the interior of pressure vessel 10 will force body section 114 into engagement with web sections 50 of sides $S_1$ and $S_2$. In a similar manner, pressure acting externally of pressure vessel 10 will force body section 112 into engagement with the ends 56 and 58 of sides $S_1$ and $S_2$. Accordingly, regardless of whether pressure is acting externally or internally of pressure vessel 10, and regardless of whether the sides $S_1$ and $S_2$ are subjected to forces tending to bow them inwardly or outwardly, seal 110, because of its flexible or resilient nature, will remain in sealing engagement with the surfaces against which they seal.

To seal between adjacent flanges of side-by-side panels, a bead of grouting 118 is employed. Grouting 118 will typically be of a type that remains flexible so as to permit flexing or bowing of the panels P without any loss of fluid-tight scaling.

In addition to the sealing described with reference to FIG. 10 between adjacent sides of the pressure vessel and the sealing described with reference to FIG. 11 between adjacent flanges of side-by-side panels, it is also necessary that the pressure vessel 10 be sealed between the end section formed by panels $P_1$ and bulkhead $B_1$ and between the end section formed by panels $P_2$ and bulkhead $B_2$.

With reference now to FIGS. 12 and 13, there is shown a typical sealing arrangement that could be employed between, for example, bulkhead $B_1$ and panels $P_1$ forming an end section of pressure vessel 10. FIG. 12 shows such a sealing arrangement as viewed from the inside of the pressure vessel 10, while FIG. 13 shows an exploded view of the same sealing arrangement such as would be seen looking from the outside of pressure vessel 10. As described above, seal member 110 runs longitudinally along the length of pressure vessel 10 at each corner wherein length is defined as the distance from bulkhead $B_1$ to bulkhead $B_2$, there being one such seal member 110 at each corner. Flexible seal members 120 are of like construction and follow the perimeter of bulkhead $B_1$—i.e., they form a sealing frame between bulkhead $B_1$ and panels $P_1$ and accordingly will not be further described. It will be understood that sealing between bulkhead $B_1$ and the panels $P_2$ is similar to the sealing described with reference to bulkhead $B_1$ and panels $P_1$. At their mutually intersecting termini, seals members 110 and 120 abut a seal cube 130 (not shown in FIG. 12), which also is resilient in nature and to which end surface 130 of seal member 110 and end surfaces 140 of seal members 120 can be glued. Because seal members 110, 120, and 140 are all resilient, there is no rigid engagement between the panels $P_1$ and bulkhead $B_1$—i.e., panels $P_1$ are free to pivot, as described above, independently of bulkhead $B_1$.

With reference again to FIG. 1, to finally assemble pressure vessel 10 once the connectors have been affixed to the panels, tie rods 11 are passed through the registering tie rod bores 68 in the case of the connectors shown in FIG. 7, or tie rod bores 91 in the case of the connectors shown in FIG. 9—i.e., there is one tie rod 11 at the intersection of each side of pressure vessel 10. Accordingly, in the case of the rectangular pressure vessel shown in FIG. 10, there will be four tie rods 11, one at each corner. In the case of a pressure vessel having a triangular cross-sectional configuration, there would be three such tie rods; and in the case of a pressure vessel having more than four sides, there would be a number of such tie rods equal to the number of sides. As best shown in FIG. 2, tie rods 11 can be made in sections, the ends of which are threaded such that the tie rods 11 could be made to any desired length. Thus, in the embodiment shown in FIG. 2, there are three sections of tie rod 11 connected by two couplings 11*a*. Tie rods 11 serve two purposes: (a) to carry the longitudinal load of the pressure vessel, and (b) to act basically as hinge pins about which the panels P can rotate. It should be observed that with pressure vessel 10 being internally pressurized, the corners of the vessel at which the two adjacent sides intersect is force balanced inasmuch as the panels of one side and the panels of the adjacent side are both responding to the internal pressure in the same manner such that the tie rod 11 experiences only a shearing force. Typically, tie rods 11 will be threaded at their ends, and nuts 11*b* will be used to exert compressive loading along the length of the tie rods 11.

While the connectors have been described with reference to the use of leaves that can be interlaminated, it is to be understood that the connectors can be constructed with any formation that permits hinging of the panels at the intersection of adjacent sides of the pressure vessel and that will permit the panels of such adjacent sides to be connected to one another, preferably such that flange portions 52 and 54 on one set of panels are in alignment with flange portions 52 and 54 on a connecting set of panels.

FIG. 2 also shows intermediate tie rods 160. Intermediate tie rods 160 are received through bores 60 in the flange portions 52 and 54. Unlike tie rods 11, which have an I.D. essentially the same as the O.D. of the tie rod bores formed in the leaves, tie rods 160 are of a smaller diameter than are the bores 60 to ensure that they do not restrain the panels P from bowing or reacting to either external or internal pressure exerted on pressure vessel 10.

As described above, while the connectors $C_A$, CX are separate components, it will be understood that the panels could be constructed such that the connectors were monolithic with the panels; however, for ease of manufacturing and flexibility in assembly, it is generally more convenient to have the connectors formed as separate components in the manner shown either in FIG. 7 or FIG. 9.

The panels P have been described with reference to flange portions that are sealingly secured together when there are a number of panels forming a side and the panels P are in a side-by-side relationship; however, the panels P can be constructed such that other formations can be employed to connect and seal the panels P in side-by-side relationship. For example, a tongue-in-groove arrangement might be employed.

In the description above, reference has been made to the panels forming the sides being hingedly connected to one another. It is to be understood that any type of connector or connective system can be employed that permits the sides at their connected interfaces to undergo some degree of pivoting or movement relative to one another at those connected interfaces and that does not induce bending stresses at those interfaces of the type commonly encountered if the sides were rigidly connected, e.g., as by welding. Although most common flexible or hinged connectors will involve some sort of pivot pin, tie rod, or the like, it is to be understood that the sides could be formed such that at their connected interfaces one side could be provided with a receiving formation, and the adjacent side, with a projecting formation, the projecting and receiving formations serving to allow a pivoting or hinging action around those interengaged formations. Another type of connector or connective system that could be employed would be a single piece of a flexible material, e.g., an elastomeric material, that could be bonded or otherwise affixed to connected interfaces of adjoining sides. Indeed, such a connector could also serve as a seal. Thus, it will be understood that any type of connector or connective assembly or system can be employed that permits the sides, whether formed of one panel or multiple panels, at their connected interfaces or edges wherein a corner is formed, to pivot or move relative to one another. It will be understood that the term "corner" as used with respect to the interconnection of the sides refers to ajuncture of interconnected sides wherein the sides are at an angle of less than 180° to one another.

This unique method of forming a pressure vessel provides many advantages. For example, in the case where the conlector involves some sort of a pivot pin, tie rod, or the like, forces acting on the panels place the panels in tension and the pins or tie rods, in double shear such that, barring failure of the material of the panels, the load limit is now governed by the shear stress on the pins. It will also be apparent that when the panels are subjected to pressure such that the pivot pins or tie rods are placed under shear loading, the panels actually increase in rigidity and strength subject to exceeding their tensile strength. In essence, and as pointed out above, the pressure vessel construction of the present invention all but eliminates bending stresses at the interfaces of the panels, bending stresses that are inherently present in any type of pressure vessel where such interfaces would be welded or otherwise rigidly connected. Thus, in the case of a pressure vessel having the rectangular cross-sectional configuration as described above, the "corner" bending stresses on the panels are virtually eliminated, the same being true of a pressure vessel of any other polygonal cross-sectional shape.

The pressure vessel of the present invention provides many advantages not heretofore found in prior art systems. For one, pressure vessels can be constructed so as to form chambers—e.g., hyperbaric chambers—having virtually any polygonal cross-sectional configuration. Furthermore, such pressure vessels can be fabricated without the necessity for welding or otherwise rigidly connecting the sides of the pressure vessel, forming the polygonal chamber. Because the pressure vessel of the present invention is modular, chambers of any desired size can be constructed simply by altering the number of panels making up the respective sides of the pressure vessel.

While a particular type of seal has been described above, it will be appreciated by those skilled in the art that various types of seals or seal systems can be employed. For example, rather than relying on grouting and/or flexible seals at the juncture of connected panels, the pressure vessel could be provided with an internal bladder or liner. Additionally, such a liner or bladder could be formed by spraying the interior of the pressure vessel with a material that would remain flexible and in effect would form a lining. Additionally, thin membranes, e.g., metallic membranes, could be welded at the interfaces of adjacent, connected panels. Thus, the term "seal" as used herein is intended to be used in its broadest sense and to encompass any system that will not deleteriously affect the ability of the panels to remain flexibly interconnected as described above but that will still function to provide a fluid-tight barrier.

As will be readily apparent to those skilled in the art, the pressure vessel of the present invention can be used to conduct hypo or hyperbaric chambers that can be used in many applications, such as mine rescue, underwater activities, e.g., in the offshore oil and gas industry, submarine rescue, marine exploration, etc. Additionally, the pressure vessels can be used in terrestrial or extraterrestrial environments. Indeed, because of the ease of fabrication and the fact that the components necessary to form the pressure vessels can be transported in compact form as opposed to transporting a welded or other such fabricated pressure vessel, the pressure vessels of the present invention find particular utility in outer space applications. Thus, space labs, human habitats, and the like for use in outer space can be constructed in outer space. Since the pressure vessels of the present invention are not limited to any particular type of material, lightweight panels and other components necessary to construct the space vessels can be more readily deployed to outer space.

The foregoing description and examples illustrate selected embodiments of the present invention. In light thereof, variations and modifications will be suggested to one skilled in the art, all of which are in the spirit and purview of this invention.

What is claimed is:

1. A pressure vessel, comprising:

a housing having at least three connected sides and forming a chamber having a cross-section determined by the number of sides, said chamber having a first chamber opening, each of said sides comprising at least one side panel, each of said side panels having a web section with a first edge and a second edge, a first flange portion extending from said first edge of said web section, a second flange portion extending from said second edge of said web section, said first and second flange portions being substantially parallel, each of said panels having a first end and a second end;

a connector on each of said flange portions adjacent each of the ends of said panel, each of said connectors having a leaf projecting outwardly of said end of said panel, each of said leaves having a first face and a second face, each of said leaves having an opening extending through and transverse to said first and second faces, the openings in the leaves on a given end of a panel being in register;

the leaves on the connected ends of adjacent panels being spaced relative to one another so as to be interlaminated when an end of one panel is connected to the end of an adjacent panel, the bores of said interlaminated leaves being in register;

a tie rod extending through the registered openings of said interlaminated leaves to hold the ends of adjacent panels in connected relationship;

a fluid-tight seal for sealing between adjacent sides; and a first closure member sealingly secured over said first chamber opening.

2. The pressure vessel of claim 1 wherein there are four connected sides forming a chamber having a generally rectangular cross-sectional configuration.

3. The pressure vessel of claim 1 wherein each of said flange portions has an inner surface and an outer surface.

4. The pressure vessel of claim 3 wherein said connector is removably secured to said inner surface of said flange portion.

5. The pressure vessel of claim 1 wherein each of said sides comprises a plurality of said side panels disposed in side-by-side relationship, each of said side panels having one flange portion sealingly engaging the flange portion of an adj acent side panel.

6. The pressure vessel of claim 5 wherein said sealing engagement is accomplished by grouting.

7. The pressure vessel of claim 5 wherein each of said flange portions has an inner surface and an outer surface.

8. The pressure vessel of claim 7 wherein each of said sealingly engaged flange portions has an aligning aperture, said aligning apertures being in register when said panels are in side-by-side relationship.

9. The pressure vessel of claim 8 wherein each of said connectors is a monolithic body and includes a body portion having an aligning boss, respective ones of said connectors being removably secured to said inner surfaces of respective ones of said sealingly engaged flange portions, said aligning bosses being received in respective ones of said aligning apertures.

10. The pressure vessel of claim 9 wherein each of said bosses has a bore, respective ones of said bores being in register when respective ones of said aligning bosses are received in respective ones of said apertures, a fastener being received in respective ones of said registered bores to urge said connector on one flange portion of a side panel toward said connector on the flange portion of said adjacent side panel.

11. The pressure vessel of claim 8 wherein each of said connectors comprises a spacer place, a leaf plate, and an aligning bushing, respective ones of said spacer plates being disposed between respective ones of said inner surfaces of said flange portions and said leaf plates, each of said spacer plates and said leaf plates having aligning bores, aligning bores of respective ones of said spacer plates and said leaf plates being in register with each other and with respective ones of said aligning apertures in said flange portions to form a connector passage, respective ones of said aligning bushings being received in respective ones of said connector passages.

12. The pressure vessel of claim 11 wherein each of said aligning bushings has a bore therethrough, said bores being in register when respective ones of said aligning bushings are received in respective ones of said connector passages, a fastener being received in respective ones of said connector passages to urge said connector on one flange portion of one side panel toward said connector on the flange portion of said adjacent side panel.

13. The pressure vessel of claim 5 wherein said sealingly engaged flange portions are connected together along their length.

14. The pressure vessel of claim 1 wherein said fluid-tight seal comprises an outer body section, an inner body section, and an intermediate web section, said web section being disposed between connected ends of adjacent panels.

15. The pressure vessel of claim 1 wherein said chamber has a second chamber opening and there is a second closure member sealingly secured over said second chamber opening.

16. The pressure vessel of claim 1 wherein said first closure member includes an access door.

17. The pressure vessel of claim 15 wherein said second closure member includes an access door.

* * * * *